July 30, 1929.  C. HEUMADER  1,722,917
AUTOMOBILE SCREEN
Filed Nov. 11, 1927    2 Sheets-Sheet 1
Fig.2.  Fig.1.
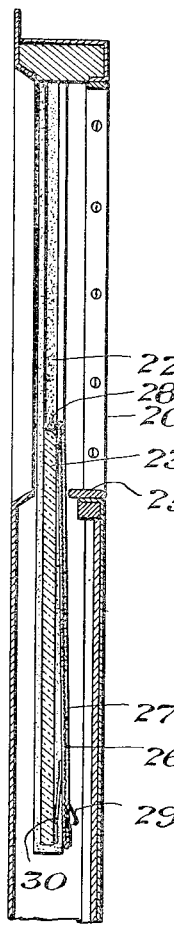
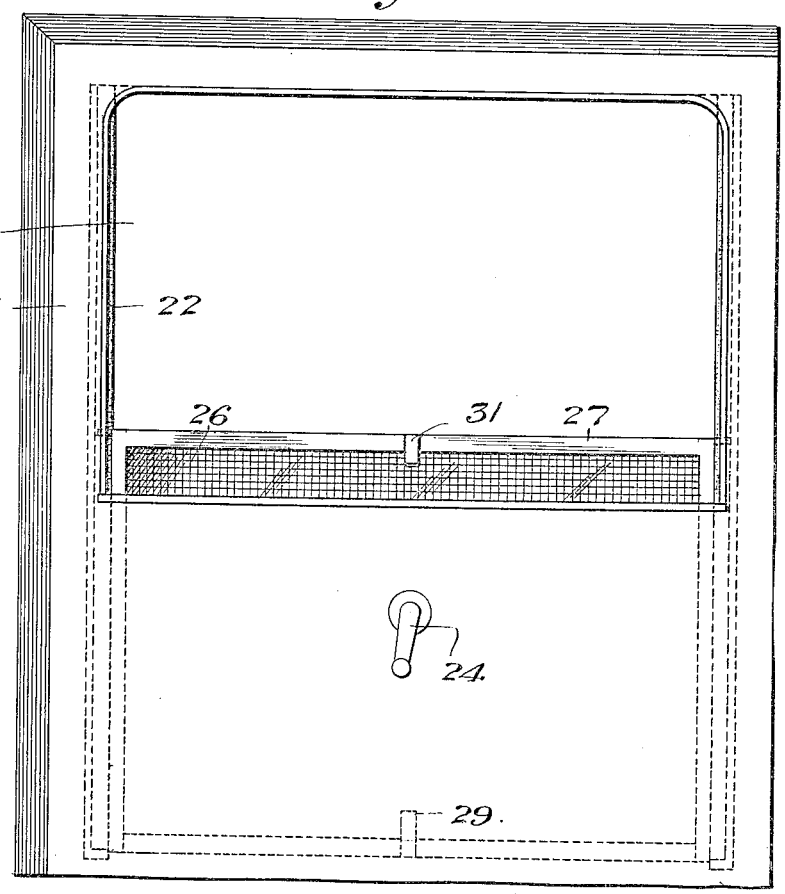
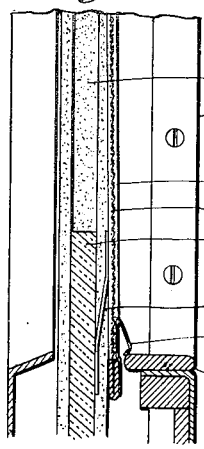
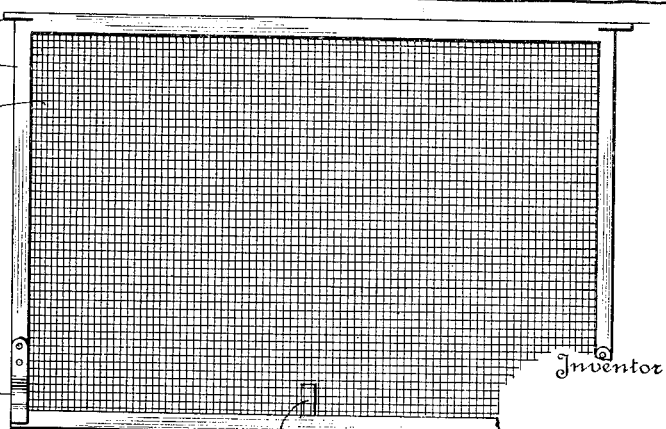
Fig.3.
Fig.4.
Inventor
Christian Heumader
By Mawhinney & Mawhinney
Attorneys

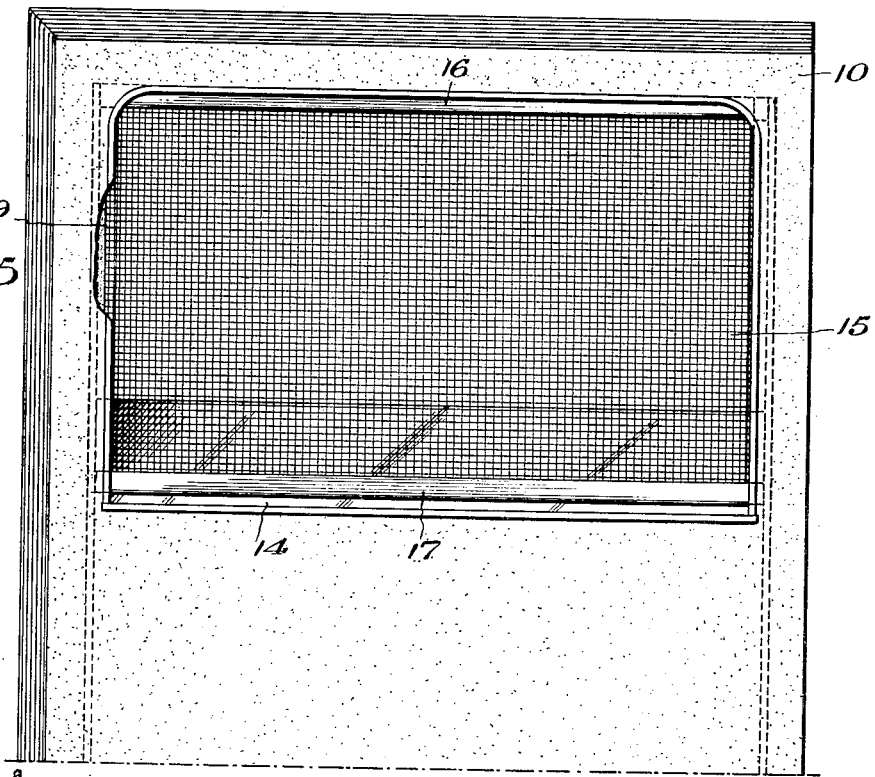

Patented July 30, 1929.

1,722,917

UNITED STATES PATENT OFFICE.

CHRISTIAN HEUMADER, OF ST. JOSEPH, MISSOURI.

AUTOMOBILE SCREEN.

Application filed November 11, 1927. Serial No. 232,673.

The present invention relates to screens for application to the windows of closed automobiles for keeping insects from entering through the windows when closed.

An object of the present invention is to provide a screen of this character which is light in weight, and which is relatively thin and of sufficient flexibility to admit of the screen being moved down into the well of the window of an automobile at one side of the pane of glass, so that the screen may be quickly and easily raised and lowered either with or independently of the pane of glass.

Another object of the invention is to provide a relatively thin and light screen which may be applied to all types of windows and automobile body constructions.

The invention has for a further object to provide a screen which may be slidably mounted in the window frame of an automobile, and which has means whereby the screen may be raised with the window pane, and which may remain in raised position after the window pane is lowered, so as to effectively close in the opening in the window with the screen.

The invention still further aims at the provision of a light and relatively flexible window screen which may be snapped into and drawn out of place in the window opening, and a screen which has means for engaging in the usual channel grooves for the pane of glass, and which may be used without altering the construction of the window frame.

The invention still further aims at the provision of a screen of this character which may be economically produced and which may be quickly and easily applied and easily carried in compact form.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary inner side elevation of a portion of a closed automobile body showing a screen constructed according to this invention applied thereto.

Figure 2 is a vertical section taken through the same.

Figure 3 is a fragmentary vertical section taken through the window with the screens shown in raised position therein.

Figure 4 is an outer side elevation of the screen removed from the window.

Figure 5 is an inside view of a portion of a closed vehicle body, showing a modified form of the window screen applied thereto.

Figure 6 is a vertical section taken transversely through the same.

Figure 7 is a side elevation of the modified screen removed from the window, and Figure 8 is a fragmentary enlarged section taken through one corner of the modified form of screen, and showing a portion of the felt channel strip which supports the glass of the window.

Referring to the drawings, and first to the form shown in Figures 1 to 4, both inclusive, 20 designates the frame or wall of a vehicle body of the closed type. The portion of the body 20 shown is a door with a window opening 21 in the upper portion thereof, and which is provided in opposite sides of the opening 21 with channel strips 22 of felt or the like as is usual. These strips 22 support therein a pane of glass 22 disposed for vertical movement in the channel strips 22 by the usual operating mechanism which is manually actuated by a hand crank 24. The window opening 21 is defined at its lower end by the usual sill 25. The screen of this invention comprises a screen panel 26 which is of the usual mesh for use in windows to exclude flies and other insects from the interior of the vehicle body, and which is mounted in a relatively thin flexible frame 27 of steel or the like. The frame is of a size to substantially fit in the opening 21 with its lateral edges in overlapping relation with respect to the inner sides of the channel strips 22, and with its lower end lapping below the sill 25 when the upper edge of the frame 27 is against or adjacent to the top of the window opening 21. The frame 27 is provided at its upper corners with a pair of laterally extending pins 28 offset slightly from the plane of the frame 27 and adapted to engage in the channels 22 above the upper edge of the pane of glass 23. These pins 28 serve to guide and lift the upper end of the screen when the pane 23 is raised by operating the handle 24 in the usual manner.

The screen frame 27 is provided near its lower end with a spring latch 29 which faces downwardly and is adapted to snap upwardly past the ledge 25 and to engagement with the upper surface thereof for supporting the screen in raised position. The latch 29 is of the spring type and may be depressed by hand to pass the ledge 25 when the screen may then be slid downwardly into the well opening of the window. In order to insure that the latch 29 engages the ledge 25, and also to facilitate the release of the latch from the window ledge, the frame 27 is provided near its lower end and at its outer side with a pair of springs 30 adapted to engage against the channel strips 22 and urge the lower end of the screen inwardly toward the ledge 25. As the frame 27 is of relatively thin flexible material, the upper part of the frame may be sprung or bowed sufficiently to engage and disengage the pins 28 with respect to the channel strips 22, so that the screen may be quickly placed in the window and removed therefrom as occasion requires.

Referring now to the modified construction shown in Figures 5 to 8, inclusive, 10 designates the wall of the vehicle body which may be a door, or one of the stationary sections at the side of the body. The wall 10 has a window therein comprising the usual opening having a sill 11 at its inner side defining the bottom of the opening and a sill 12 at its outer side, the latter being formed of sheet metal or the like in the usual manner. The wall 10 carries at opposite sides of the opening channel strips 13 which are coextensive with the height of the window opening, and which are also projected down into the well formed in the wall 10 below the sills 11 and 12, so as to receive a pane of glass 14, which is slidably fitted in the channel strips 13 in the usual manner.

The screen of this invention comprises a reticulated panel 15 of wire screening of the usual mesh for preventing passage of insects therethrough and which is of a size adapted to close the window opening. The top and bottom edges of the screen panel 15 are provided with resilient strips 16 and 17 preferably formed of sheet metal which are overturned and flattened upon the upper and lower edge portions of the panel 15, so as to secure the resilient strips 16 and 17 thereto and to also hold the panel 15 taut when the screen is in place. The strips 16 and 17 have projections 18 at opposite ends which extend beyond the panel 15 and are relatively flat, so as to enter the channel strips 13 between the pane of glass 14 and the adjacent side of the channel strips. This construction of projections 18 admits of the overlapping of the screen panel 15 on the glass panel 14, as shown in Figure 6, the cases where the panel 14 cannot be moved all the way down out of the window opening, or where it is desired to check the draft through the lower portion of the window opening. The lateral edges of the screen panel 15 are left free and are preferably offset to provide overlapping flanges 19, as shown to advantage in Figure 8.

The flanges 19 are adapted to lap over the inner faces of the inner sides of the channel strips 13, so as to effectively seal the sides of the screen against the channel strips. The upper resilient strip 16 is adapted to fit in the upper ends of the channel strips 13 and against the under side of the top rail of the window, so as to seal the top of the screen in the window opening.

The strips 16 and 17 may be made of steel so as to impart the necessary strength and resiliency to the strips as the screen is applied by bowing the strips 16 and 17 away from the window and inserting the projections 18 in the channel strips 13 and sliding the strips 16 and 17 upwardly until the strip 16 strikes the top of the window frame.

The flexible screen panel 15 necessarily bends with the strips 16 and 17 so that the screen may be slid upwardly into the desired position and will then straighten out under the resiliency of the strips 16 and 17 into flat positions so as to bring the flanges 19 into overlapping and close contact with the inner sides of the channel strips 13. The screen is thus firmly held in place and may be quickly and easily removed by merely bowing the strips 16 and 17 out of the window. The screen may also be applied from either the inner or the outer sides of the window as it is of a construction capable of fitting in and against either the outer or inner sides of the channel strips 13.

It is obvious that various changes and modifications may be made in the details of construction and design of the above specifically described embodiment of this invention without departing from the spirit thereof, such changes and modifications being restricted only by the scope of the following claims:—

What is claimed is:—

1. A screen for automobile windows comprising a relatively thin flexible screen panel, lateral projections on the upper corners of the panel for engagement in the channels of the window to guide the panel in its up and down movements and offset from the panel to engage the upper edge of the window pane for lifting the screen therewith, a latch mounted on the lower end of the screen panel for engagement with the window ledge to support the panel when raised, and springs mounted upon the outer side of the screen panel for engagement with the channels to urge the latch into interlocking position with the ledge.

2. A screen for automobile windows comprising a flexible screen panel of a size adapted to substantially fill the window opening, and resilient strips secured along top and bottom edges of the screen panel and projecting beyond the same for engagement in the panel strips of the window, said resilient strips adapted to be bowed away from the window for positioning and removing the screen, said resilient strip at the top edge of the panel having its projecting ends offset to one side of the panel for engagement by the upper edge of the window pane for raising the screen therewith.

In testimony whereof I affix my signature.

CHRISTIAN HEUMADER.